United States Patent [19]
Robinson et al.

[11] 3,885,017
[45] May 20, 1975

[54] HYDROMETALLURGICAL LEACHING
[75] Inventors: Charles W. Robinson, San Francisco; Kenneth E. Merklin, Tiburon, both of Calif.
[73] Assignee: Marcona Corporation, San Francisco, Calif.
[22] Filed: Nov. 1, 1973
[21] Appl. No.: 411,912

Related U.S. Application Data
[63] Continuation-in-part of Ser. No. 305,144, Nov. 9, 1972, abandoned.

[52] U.S. Cl................ 423/1; 134/25 R; 423/31; 75/101 R
[51] Int. Cl................ C01b ; C01c ; C01d ; C01f ; C01g ; C22b
[58] Field of Search............... 423/1, 23, 27, 31, 32, 423/41, 139, 659; 23/267 B, 267 F, 267 R, 269, 270 R, 271; 75/101 R; 134/25 R

[56] References Cited
UNITED STATES PATENTS
| | | | |
|---|---|---|---|
| 1,240,904 | 9/1917 | Trent | 23/271 |
| 1,283,364 | 10/1918 | Trent | 423/31 |
| 1,307,329 | 6/1919 | Trent | 23/271 |

*Primary Examiner*—Edward J. Meros
*Assistant Examiner*—Eugene T. Wheelock
*Attorney, Agent, or Firm*—Flehr, Hohbach, Test, Albritton & Herbert

[57] ABSTRACT

A process and apparatus for hydrometallurgical leaching of unseparated, crushed mineral ores using a vessel having liquid stream forming nozzles in the lower portion thereof which operate to direct a stream of leaching liquid into solids in the lower portion of the vessel and to create a highly agitated interaction zone above which solids are settling under gravity and through which liquid from the lower portion rises upwardly in counter-current flow. The vessel is sufficiently high that an overflow of low solids content liquid is taken from the top. Outlets, as for example discharge piping or sumps, are provided in the bottom of the vessel for the controlled removal of solids therefrom. In multistage operation, the solids content of the overflow liquid is removed and the liquid content of the underflow is removed and combined to yield a mineral pregnant liquor which serves as the leaching liquid for a preceding stage where less depleted solids are being processed. Solids removed from a stage are passed to a subsequent stage where less pregnant leaching solution is used, so that the solids not only are processed in each stage in counter-current flow to the leach solution, but the interstage progression of the solids and leaching liquid is also counter-current. Single stage continuous operation is also disclosed in which solids having passed downwardly through the reactor are discharged periodically through a discharge trap formed in the lower portion of the vessel so as to minimize the amount of liquid discharged with the solids.

9 Claims, 4 Drawing Figures

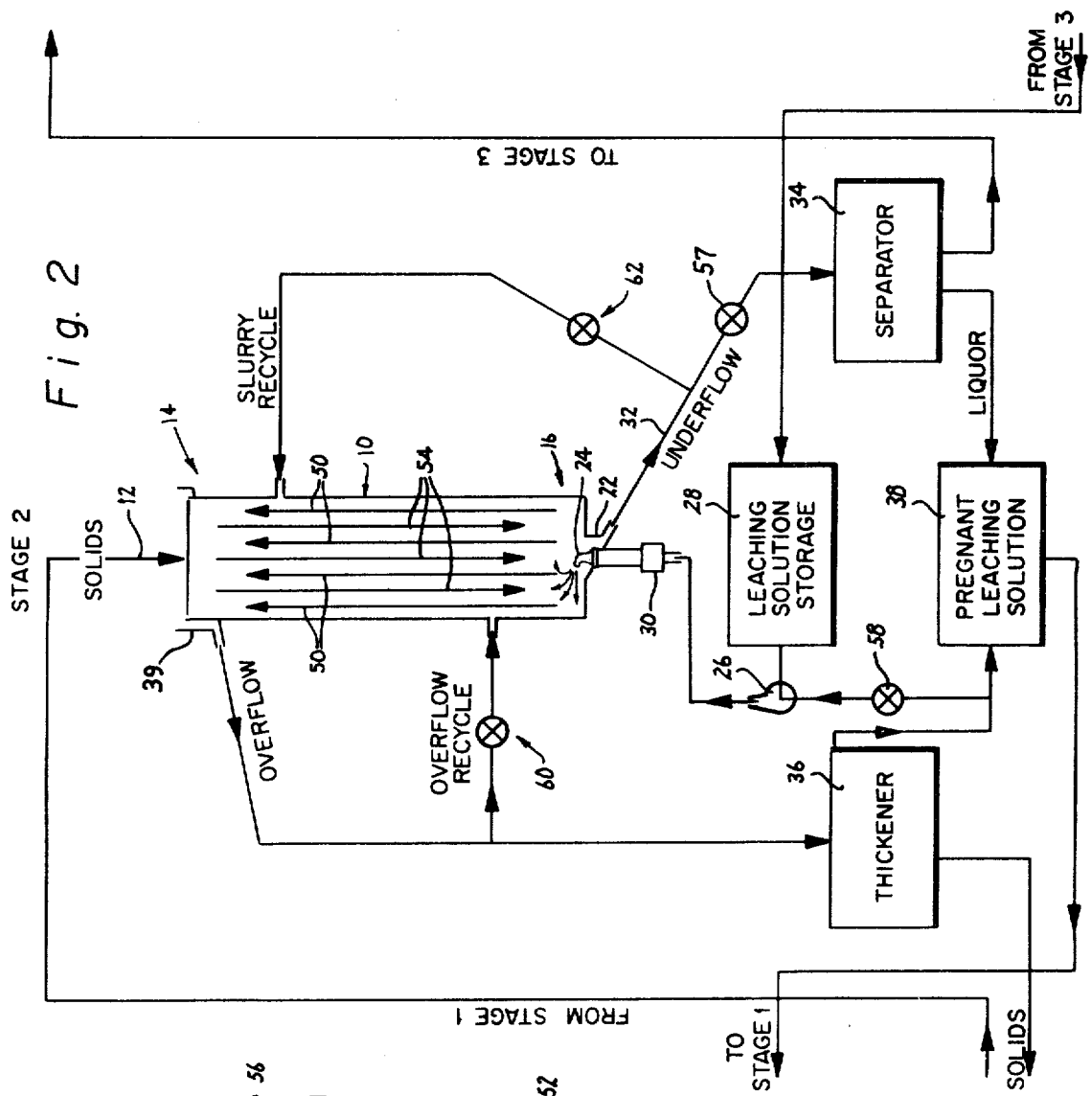

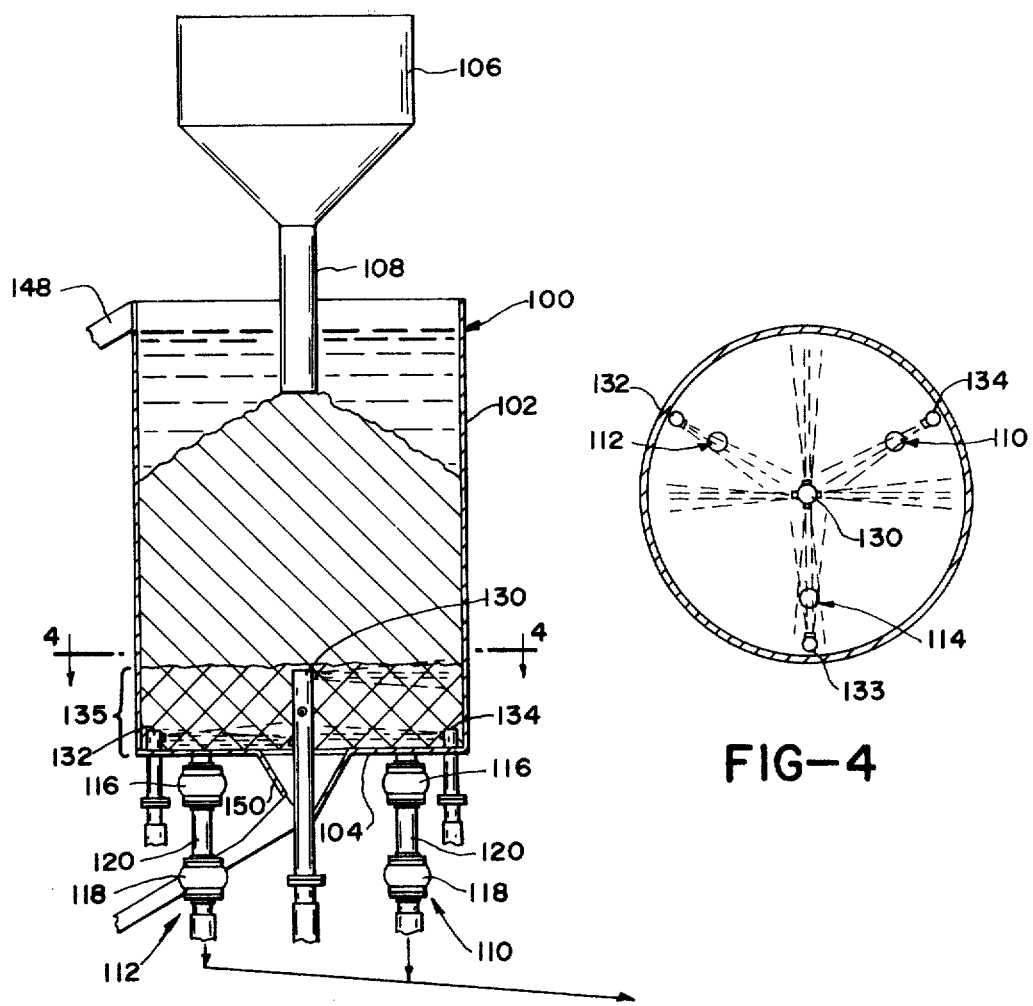
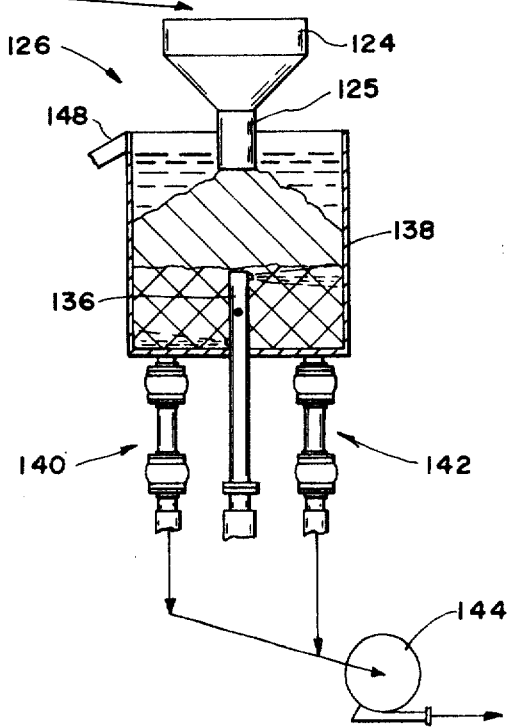
FIG-3
FIG-4

HYDROMETALLURGICAL LEACHING

This application is a continuation-in-part of U.S. patent application Ser. No. 305,144, filed Nov. 9, 1972, for HYDROMETALLURGICAL LEACHING now abandoned.

BACKGROUND OF THE INVENTION

This invention relates to hydrometallurgical leaching processes and apparatus and more particularly to the recovery of copper or other metal values from ores by such leaching. Although the procedures and apparatus to be disclosed herein are set forth with specific reference to the hydrometallurgical leaching of copper ores, these same procedures and apparatus will be found applicable to other similar types or ores. Accordingly, the specific discussion of copper ores herein should be taken as an illustration of the specific application of the invention to that case. But, the scope of the invention should be taken more broadly, limited only by the scope of the appended claims.

In general, hydrometallurgical metal recovery processes include preparation of the material, usually ore, dissolution of the values from the ore into solution, and subsequent recovery from solution by suitable procedures. The dissolution step is commonly carried out as a leaching operation; the most frequently used procedures being heap leaching, percolation leaching, or some form of agitation leaching. While leaching under pressure or by bacterial action are also known, they are generally not of interest in the present context.

In some circumstances, heap leaching finds use with low grade ore bodies having marginal economics but generally requires a long leaching cycle which may extend for months and a high consumption of leaching solvent. In percolation leaching in vats the ore is crushed to the size of approximately ⅜ inch top size, after which the ore is loaded into the vats and the leach solution percolated through the ore at a predetermined rate. In general, the ore in vat leaching remains in static condition, and problems arise in attempting to reach high leaching efficiency due to excessive fines which develop during breakdown of the ore and which either block proper flow of the leaching solution through the vat or cause channeling of the flow such that the solution fails to reach such a large portion of the ore that extraction of all of the values becomes difficult if not impossible. Thus, while vat leaching is reasonable in cost with respect to operation and capital outlay and does not contain undue grinding requirements, it nevertheless is not completely satisfactory due to poor recovery and long leaching times. In addition, the exhausted ore has to be mechanically removed from the vat usually with grab buckets, which results in a material handling problem each time the vat is unloaded and also results in mechanical damage to the vat and consequent high maintenance costs.

In addition to the foregoing, various types of agitation leaching have been used particularly for fine materials obtained either from separation from crushed ores used in vat leaching or by additional grinding. Agitation is carried out either using mechanical agitators where the energy of mixing is supplied by a rotary shaft coupled to an impeller or raker arm, or the so-called Pachuca agitator, in which the agitation is supplied by an air lift rising through a slurry pulp of the ore and leaching solution. In order for either of these agitation systems to work properly, the additional grinding must be carried out to between minus 10 to minus 48 mesh. Agitation leaching of this size material does provide for high metal recovery rates; however, the capital cost and cost of operation of such a combination may be high, and requires high preparation costs associated with ore grinding and separation. Furthermore, there is a size range between the coarse material used in vat leaching and the finely ground material used in agitation leaching for which no really satisfactory leaching system exists.

In view of the above limitations and disadvantages there is a need for an improved process and apparatus for hydrometallurgical leaching.

SUMMARY OF THE INVENTION AND OBJECTS

In general, it is an object of the present invention to provide a process and apparatus for hydrometallurgical leaching which will overcome the above limitations and disadvantages, and which particularly is operable to solve the problem of material handling created by the movement of the solid phase, both during the leaching operation and when exhausted, and which simultaneously provides this advantage while eliminating the requirement of high grinding costs and coarse and fine fractional separation.

Another object of the invention is to provide a process and apparatus of the above character in which the ore preparation requires only crushing to about ⅜ inch top size, such crushed ore requiring no further grinding or separation, and which provides recovery efficiencies comparable to those obtained in agitation leaching. In addition, the use of crushed ore of lower top size results in the ability to form a pumpable slurry which is readily handleable by the techniques disclosed herein and also by commonly available slurry handling equipment.

A further object of the present invention is to provide a process and apparatus for the leaching of ores which is adaptable to either single stage or multiple stage operation, which will readily accept relatively coarse material as well as fines so that the leaching can be accomplished in a single system, which is inherently immune to clogging.

A further object is to provide a process and apparatus of the above character which also makes use of the leaching liquid injection apparatus to provide for selective removal of the solids from the vessel either continuously or in batches.

Another object of the invention is to provide the process and apparatus for hydrometallurgical leaching which is essentially uncloggable and which maintains the solid phase and the liquid phase in constant motion and further in which forcible contact of the liquid phase with the solid phase is accomplished in an agitation zone having continuous intermixing and redistribution of the solids in an incoming stream of the liquid phase.

Another object of the hydrometallurgical process and apparatus of the present invention is to minimize capital costs for the leaching equipment while maintaining a high percentage recovery of the desired value and further in which the cycle time for leaching of coarser solids is substantially reduced.

Another object of the invention is to provide a hydrometallurgical process and apparatus of the above character which lends itself to multistage operation each stage of which is substantially similar to and thereby interchangeable with the succeeding or preceding stage whereby cycling of leaching liquid alone between the stages effectively causes transfer of the solids between stages without the need for physical movement of solids from one place to another.

Another object of the invention is to provide an improved hydrometallurgical leaching process and apparatus of the above character which eliminates the need for direct mechanical agitation such as rake arms or impellers, and which does not place requirements for coarse and fine separation on the material size used and accordingly is capable of operating as a single reactor and complete processing stage, accepting suitably crushed ore.

Another object of the invention is to provide a hydrometallurgical process and apparatus which achieves a high degree of agitation and intermixing of the leaching liquid with an ore solids phase using a high energy liquid jet.

Another object of the invention is to provide a closed system for recycling of the leaching solution and which allows for heating of the solution for addition of mineral content to the solution, as for example the addition of sodium chloride, or the addition or replenishment of oxidizing agents which could assist in accelerating the leaching process.

Another object of the invention is to provide a hydrometallurgical process and apparatus of the above character in which the solids flow through and residence time is determined by the controlled periodic discharge of predetermined quantities of solids.

Another object of the invention is to provide a hydrometallurgical process and apparatus fo the above character in which a gas volume is introduced into the lower portion of the reactor vessel, usually periodically, to obtain addition disturbance and agitation of the contained bed of material.

In general, the foregoing objects are achieved by providing a process and apparatus using a large upright vessel having side walls and a bottom wall. Solids discharge outlets are formed in the bottom wall. Means are provided for supplying a leaching liquid in a stream or streams directed generally parallel to and above the bottom wall of the vessel. The stream or streams are progressively traversed as by rotation or oscillation to sweep over the bottom of the vessel and create a highly agitated reaction zone in the lower region thereof. Ore solids are crushed to a top size of about —⅜ inch and are introduced without further grinding or separation at the top of the vessel to move under gravity, and pass counter-current to a generally upward flow of leaching liquid. As the solids enter the lowermost region of the vessel, they are impacted by the streams and are brought into a highly agitated state. Solids are withdrawn from the lower region of the vessel after having passed therethrough and either may be recycled in the same stage or taken to subsequent stages if multi-stage operation is utilized. If the mineral recovery is satisfactory, the solids can be passed immediately to a washing stage. Leaching liquid, now pregnant, is removed from the top of the treatment vessel and is either recycled, taken to the preceding stage in interstage countercurrent flow with respect to the solids if multi-stage operation is used, or processed to recover the contained values. In one preferred form of the present invention, the vessel is provided with a discharge trap which facilitates the accummulation of solids with a minimum amount of liquid for periodic discharge from the vessel.

The frequency of discharge of solids determines the residence time of the solids in passing through the vessel. In addition, provision is also made for the introduction of quantity of gas, usually air, as a bubble which passes upwardly through the bed of solids and liquid to promote further agitation of the bed when in the vessel. These and other objects and features of the invention will become apparent from the following detailed description when taken in conjunction with the accompanying drawings which relate both to multiple and single stage arrangements for carrying out the present invention.

FIG. 1 is a schematic diagram of a hydrometallurgical apparatus constructed and adapted in accordance with the present invention.

FIG. 2 is a schematic illustration of a stage of a hydrometallurgical leaching process and apparatus for carrying out the present invention.

FIG. 3 is a schematic view in cross-section of a continuously operating single stage form of leaching apparatus constructed in accordance with the present invention.

FIG. 4 is a cross-sectional view taken along the lines 4—4 of FIG. 3.

Referring to FIGS. 1 and 2, there is shown a single stage of apparatus for carrying out the procedure of the present invention. It should be understood that preceding and subsequent stages substantially identical to the single stage illustrated in FIG. 2 may be connected therewith in series such that liquid and solids movement proceeds from stage to stage in counter-current flow as will be described. Since each stage is substantially the same and for the sake of clarity of presentation, the description herein is set forth by illustration of a single stage and by general reference to preceding and succeeding stages. It is a feature of the present invention that it is adaptable for use either in multi-stage operation if required for satisfactory and economical processing of the ore, or in single stage operation.

Solids suitable for use in the present invention should be sized, ground or crushed to about —⅜ inch top size. In general, this will require only known ore crushing procedures and no grinding will be required. Grinding contemplates reduction for example to −10 mesh or lower and requires a rod or ball mill in usual practice. This grinding to such a small size and its costs can be eliminated by the present invention.

The ore passed through such size reduction is now sufficiently subdivided and is ready to be used without any separation steps; for, all ore sizes from —⅜ inch to fines can be processed in the reactor disclosed herein.

Each stage includes a reactor vessel 10 in which the leaching action takes place. The crushed solids are introduced at an input 12 arranged at the upper end 14 or top of the vessel while the leach liquor is introduced into the lower portion 16 of the vessel so that the leaching liquor creates a column which is gradually rising through the vessel and eventually overflowing while solids settle downwardly under gravity and generally pass from the top to the bottom of the vessel. The vessel is formed with side walls 18 and a bottom wall 20. Means is provided for forming a sump 22 in the bottom wall, together with a jet nozzle 24 for supplying leaching liquid under high velocity in a stream directed generally parallel to and over the bottom wall from a position above the sump. A pump 26 is provided for receiving leaching solution from a source such as generally indicated at 28.

While the vessel shown herein shows an arrangement using a horizontal bottom wall and horizontally directed jet stream, it should be appreciated that a conically sloped bottom wall of the vessel could be used and that the jet would then have to be directed upwardly at the same angle and somewhat above the bottom wall level. In this position the stream is still directed generally parallel to the bottom wall even though the latter is sloped. Accordingly, the phrases—generally parallel to the bottom wall,—substantially horizontal—, or—at a substantial angle to the vertical—as used herein and in the claims should be interpreted as comprehending a reasonable range of directions as well as the horizontal limit discloses for the purpose of illustration. It is not expected that this range will exceed 45°, at the other limit.

A suitable drive system 30 is arranged with respect to the liquid for carrying the liquid jet nozzle and for rotating the same so that the liquid jet is progressively moved over the bottom of the vessel and the stream therefrom is swept through an arc. Suitable piping 32 carries the underflow from the sump to a liquid-solid separator indicated at 34. Means is provided for forming a wier 39 at the top of the vessel for taking overflow liquid which is passed to a thickener 36 which removes solids and delivers the resultant pregnant solution at 38. Leaching liquor recovered from the underflow is also taken from separator 34 to pregnant solution storage 38.

The wier 39 is formed at the entire periphery of the top edge of the vessel and includes a collection through 40 which surrounds the top of the vessel and slopes and drains into an outlet pipe 41. By using the entire periphery of the vessel the height of flow over the wier is reduced to a minimum and higher solids separation efficiencies are obtained.

The vessel is constructed in an upright configuration of preferably circular cross section having a height sufficient to permit the development of essentially three zones within the vessel as will be described. At this point it will be helpful to recall that the usual settling of solids phase from a liquid phase results in three general zones: the compacted, lower zone; above this a zone of hindered settling in which particles are in contact a certain amount of time; and above the hindered settling zone, a zone of free settling in which particles are not in sufficient contact to be a factor. In the present invention, formation of the lower compacted zone is prevented and that same region is developed into a highly agitated zone as will be more fully described.

In this connection, the present invention possesses a significant advantage in that start-up, or restart from shut-down is effected by the operation of the jet itself and is accordingly a single and easy procedure. This is in contrast to normal mechanical agitation leaching systems where start-up, especially after shut-down during operation often involves the expenditure of considerable time and expense.

Assuming that the vessel is initially loaded with an appropriate quantity of ore pulp, operation proceeds by introducing the leaching solution through the nozzle 34 as a high-velocity jet stream indicated at 44. This stream progressively moves through the solids in the lowermost portion of the vessel about an axis of rotation as to sweep out a generally circular path lying in a substantially horizontal plane. This causes the development in the lowermost region of the vessel of a highly agitated reaction zone 46 in which constant intermixing and forcible contact between the leaching liquid and the solids within that zone takes place. The degree of agitation produced in the zone is sufficiently high that constant redistribution of solids in the zone takes place without any accumulation of settled solids. As additional leaching liquid is introduced, the liquid stream rises generally as a column indicated by arrows 50 and passes from the agitation zone and through the solids above that zone until overflow through the wier 39 takes place. The height of the vessel is such that the zone 52 above the agitation zone operates with counter-current flow of the leaching liquid percolating upwardly through settling solids 54. Above these is a third zone 56 which the leaching liquid gradually clarifies and reaches the overflow. Thus, the vessel can be generally characterized as providing counter-current movement of a column of solids with relation to a rising column of leaching solution, the solution being injected in a high velocity stream creating constant agitation in the lowermost zone 46 above which the solids are progressively more settled with the general percolation of the leaching solution through the solids. Above the solids zone 52 is essentially liquid from which solids have settled and, the liquid being pregnant from the effective leaching.

In addition to the foregoing description of the various zones in the vessel, certain additional features are found when operating in accordance with the present invention. In general, the coarse materials settle faster in the counter-current stream of leaching liquid while the fine material settles somewhat more slowly. Therefore, the residence time of the fines in passing through the leaching liquid is somewhat greater than that of the coarser material. Depending on the leaching liquid flow rate, some of the fines may not settle at all and will overflow or travel upwardly with the leaching liquid. Where the flow rate is sufficiently high, the character of the fines can be such that they do not settle readily. However, the amount of residence time required to extract the values from the ore solids is inversely related to their size so that the fines need only spend a short residence time in the vessel whereas the coarser materials should spend the longest. Accordingly, it is often found that the settling rates of certain materials in the rising leaching solution corresponds with the required residence time. For this reason, in certain situations, the fines which overflow with the leaching liquid may be discarded after being passed through a thickener for recovery of the liquor, and the upward flow rate of leaching liquid can often be adjusted to maintain an adequate residence time for the finer materials.

In other situations, this natural classification may have the opposite effect and be undesired, that is to say, the fact that the larger size pieces settle downwardly at a faster rate than the smaller size pieces results in those fines with low but positive settling rates spending a longer residence time in the reactor than the larger pieces. Furthermore, discharge of any of the solids from the top of the reactor vessel necessitate additional solids liquid separation of the overflow which in many cases is not desired. Thus, the natural classification can tend to work against the desired results since the larger pieces which require the longer treatment time settle and are withdrawn before the desired treatment has been completed. In this situation, removal of the solids from the lower portion of the vessel and recirculation of them through the vessel by reintroducing them at the top will permit the solids to receive sufficient treatment. In addition, the existing load of solids and fines already in the vessel will cause the solids being recirculated to spend an even longer second pass residence due to being impeded in settling by the solids already present. In either case, and depending upon the nature of the distribution of sizes of the solids being processed, it is possible to effect satisfactory leaching residence times for the various solids fractions, either with the assistance of the natural settling and classification of the solids as they pass through the reactor or if this is adverse, by the employment of suitable recirculation of the larger solids.

The solids within the vessel are removed either periodically or continuously through the sump 22 by the opening of a suitable valve 57. The nature of the reaction of the jet nozzle in maintaining the lower highly agitated slurry zone within the vessel is such that the withdrawal of solids as an underflowing slurry is rapid and effective under all conditions. Solids removed are either passed to the next or succeeding stage after being passed through the separator 34 to recover pregnant leaching liquid, the succeeding stage possessing leaching liquid of less pregnant character. If the solids are exhausted they can be sent to tailings.

The overflow of pregnant leach solution is passed through thickener 36 to remove any entrained solids and is then either passed to metal value recovery extraction or to an adjacent stage to react with solids which are less depleted.

During the operation of each stage illustrated it may be desirable to either pass a portion or all of the overflow back through a proportioning valve 58 and the jet nozzle or directly into peripheral locations located in the lower portion of the vessel as through overflow recycling line and valve 60.

In some circumstances, recycling of the solids in the same vessel may be desired, in which case this is easily accomplished by returning underflow solids withdrawn from the sump as a slurry to the uppermost portion of the vessel through slurry recycle line and valve 62. Such a procedure will ensure circulation of the solids, particularly if the solids are being batch processed with respect to that stage.

An example of the use of the present invention will now be given:

A typical oxide copper ore bearing 0.7% copper oxides was crushed in a cone crusher to ⅜ inch. A quantity of this ore was introduced into the reactor vessel by pumping the same as an aqueous slurry and draining off the entraining water. Lixivant of 6% $H_2SO_4$ was jetted into the lower region of the vessel. This acid rose upwardly through the solids forming an overflow which was passed through the thickener and the liquid phase returned through the jet nozzle. These operations were continued for about three hours, at the end of which copper recovery by leaching was about 90% complete and the pregnant liquor was suitable for further processing.

The pregnant liquor was then drained off, the solids washed, as with water, to remove any residual values. Thereafter, the solids were discharged as a slurry by the operation of the jet mechanism using water as the liquid entraining phase.

In the foregoing example, it will be noticed that the solids, after leaching is completed, were removed in a water suspension as a slurry. Like the leaching operation itself, this procedure is carried out under flooded conditions in which the high velocity jet stream works into the solids in the lowermost region of the vessel. The solids impacted by the stream are repulped by it and drain back to the sump as a dischargeable slurry. By progressively moving the jet, new solids are continually being impacted and removed until the material in the lowermost region is reduced to less than that which will support the weight of the solids above. The entire load then shifts downwardly to be removed in turn.

Referring now to FIGS. 3 and 4 there is shown another embodiment of leaching apparatus constructed in accordance with the present invention and which provides for particularly simplified solids feed through operation as well as periodic solids removal in a controlled manner to regulate solids residence time as well as providing for the intermittent introduction of an agitating gas stream into the lower region of the reactor. Thus, as shown, there is provided a vessel 100 having side walls 102 and a bottom wall 104. Means are provided for choke feeding solids into the reactor and consists of the hopper 106 which passes through a chute 108 downwardly into the uper region of the vessel. Solids are thereby introduced into the vessel up to the lower end of the chute 108, and as solids level is lowered additional solids are automatically fed by gravity so as to maintain the upper height of solids at the level established by the lower end of the chute.

Means are provided for intermittently removing solids from the vessel and consists of discharge traps 110, 112, and 114. Each of the traps consists of an upper valve 116 and a lower valve 118 interconnected by a discharge volume determining pipe section 120. The outlets of each of the lower valves 118 are passed to either a succeeding leaching stage, or, preferably if single stage operation can be effected, to the solids input hopper 124 of a washing stage 126. Each valve is of a suitable type as for example a pinch valve consisting of a housing containing a sleeve of elastomeric material therein which is compressed by external and pneumatic pressure so as to close the valves. Such valves are available from the Clarkson Company of California.

In operation, controls associated with the valves permit the sequential opening and closing thereof so that when the first valve is opened solids from the reactor empty into the pipe section and first valve. The pipe section 110 thus defines a solids discharge volume. Subsequently, the first valve is closed and the second valve opened to thereby intermittently discharge an amount of material from the lower region of the reactor. It is found that with an open air access available to the second valve that after discharge the volume defining pipe section is filled with air and upon repetition of the cycle closing the second valve and opening the first valve, this air volume is introduced into the bottom region of the reactor as a gas bubble which purges upwardly through the vessel and thereby work the bed so as to further prevent channeling within the contained material. Accordingly, the discharge traps also serve as means for periodically introducing a gas bubble into the lower region of the vessel.

Means are provided for introducing leaching liquid into the lower region of the vessel 100 and consists of a plenum chamber type upstanding nozzle 130. In addition, to provide for greater scope of coverage, other nozzles 132, 133 and 134 are positioned about the periphery of the vessel. Means are provided for oscillating or rotating each of the nozzles to sweep out an arc over the bottom of the vessel. As the leaching liquid is introduced, the entire lower region of the vessel up to the height determined by the height of the uppermost ones of the nozzles is turned into an agitated reaction zone wherein the solids are vigorously intermixed with the incoming leaching liquid. For clean up purposes, a sump 150 may also be provided in the lower region of the vessel in a manner similar to that set forth with respect to the apparatus shown in FIGS. 1 and 2, so that the vessel may be emptied from time to time.

The washing stage 126 is similarly constructed to the leaching stage. Thus, there is provided nozzle means 136 for introducing a washing liquid, usually water, into the lower region of a vessel 138 so as to create an agitated zone in the bottom of the vessel and thereby facilitate release of metal values from the solids by washing action. The input feed hopper 124 automatically choke feeds material from the prior stage into the vessel through a chute 125 in the same manner as that described with respect to vessel 100 and chute 108. Outlets 140, 142 are provided in the bottom wall of the washing vessel and are constructed in the same manner as the solids discharge traps 110, 112, 114 previously described. The output of the solids discharge traps is passed to a suitable slurry pump with sufficient make-up water to facilitate rapid handling of the exhausted solids.

The operation of the apparatus of FIGS. 3 and 4 will now be described in greater detail. Let it be assumed that leaching liquid in an appropriate quantity is being introduced into the lower region of the vessel and that solids have been introduced through the hopper 106 and chute 108 to a predetermined height within the vessel. As additional leaching liquid is introduced, the liquid creates a vigorously agitated zone in the lower region of the vessel in which solids that have been moving downwardly are vigorously contacted by the incoming leaching liquid streams. The entire flow of material through the reactor is counter-current, the pregnant leaching liquid ultimately rising to the top passing out the overflow wier 148. The pregnant liquid may then be treated in the same manner as in the apparatus of FIG. 2.

Periodically, the discharge traps are operated to take on a load of solids by the opening of the upper valve while maintaining the lower valve closed. Solids preferentially fill the trap displacing essentially all the liquid except for that contained in the interstices. The upper valve is then closed and the lower valve opened to discharge a predetermined quantity of solids. As the solids are taken into the discharge trap, a gradual movement of the entire bed contained within the reactor takes place. In general, the maintenance of a high degree of movement of the material within the reactor is achieved by a combination of the working of the material due to periodic withdrawal of solids from the bottom as well as the surge created by the traversing jet streams moving about in the lower region of the vessel.

The foregoing primary forces are aided, in addition, by the introduction of a gas bubble, usually air, during each cycle of operation of the discharge traps. This rising gas passes through the bed of material and moves the material sufficiently to prevent channeling of liquid paths through the bed. In this way, there is provided in the disclosed apparatus a means for a controlled selective withdrawal of essentially solids from the bottom of the reactor while maintaining an upper counter-current flow of leaching liquid. It is believed that the solids content of material removed from the lower region of the vessel can be maintained at such a high level that the loss of leaching liquid simultaneously with the discharge of solids will not be an appreciable factor. The residence time of the solids passed through the reactor is controlled by the rate of operation and defined volume of the discharge traps.

In general, the operation of the reactor as disclosed is exceedingly simple with respect to solids handling inasmuch as the feed is by gravity and is automatic without moving parts. The valves utilized in the discharge traps are reliable and simple to operate and provide total control of the solids movement rate. It should also be pointed out that the leaching liquid circuit can be maintained in a closed circuit so as to avoid environmental impact and also permit the controlled modification of the leaching liquid to optimum conditions. This includes the possibility of heating or of adding oxidizing agents to the lixiviant.

While the operation of the apparatus of FIGS. 3 and 4 is similar to that of FIG. 2, there are important differences. For, by having the particular feed arrangement disclosed, the reactor is divided into only two zones; the lower agitated zone, and an overlying zone of solids-in-contact slowly moving downwardly toward the agitated zone. Thus, the free-settling zone of the apparatus has been eliminated while obtaining the added feature of an automatic, non-mechanical solids feed arrangement. While there has been disclosed particular forms of the invention which are believed suitable for carrying out the present invention, it should be understood that many modifications and variations can be made to the disclosed apparatus without departing from the spirit and scope of the present invention. For example, the discharge traps of the appartus shown by FIGS. 3 and 4 also provides means for introducing gas bubbles into the lower regions of the reactor. Such means could easily be separately provided if desired. Furthermore, while there has been shown herein apparatus having bottom mounted jet stream nozzles, it should be understood that the actual mounting arrangement can be varied, as for example by mounting the entire nozzle as a removable or fixed structure suspended from the top of the vessel and extending downwardly into the lower region. Accordingly, the scope of the present invention should be taken generally in accordance with the scope of the following claims and without specific reference to the particular features disclosed by way of example herein.

What is claimed is:

1. A method for leaching the extractable mineral values from an ore having particulate form using a reactor vessel in which ore and a leaching liquid are simultaneously placed in contact, comprising the steps of introducing the ore into the upper region of the reactor vessel and simultaneously introducing the extracting liquid into a lowermost region of the vessel such that the solids gradually move as a solids-in-contact bed downwardly under gravity through a rising column of extracting liquid to provide counter-current extraction of the values from said ore, and further comprising the steps of directing the extracting liquid as a rotating agitating stream in a region generally parallel to and above the bottom wall of said vessel, progressively moving said stream about said lower region at a speed sufficient to cause the development of a highly agitated reaction zone in said lower region, the agitation being sufficiently great that constant intermixing and recontact is obtained between the liquid and the solids in said zone, simultaneously withdrawing a liquid overflow stream from the upper region and withdrawing solids as underflow from said lower region of said vessel and, controlling the rate of solids withdrawal so that a substantial predetermined height of solids introduced into the vessel is maintained in an overlying zone of solids-in-contact, said overlying zone gradually moves downwardly toward and then through said agitation zone at a rate controlled by said solids withdrawal rate, said overlying zone being in contact with said agitation zone.

2. The method of claim 1 further including crushing the ore to top size of about —⅜ inch and supplying the ore so crushed for introduction to the vessel without further subdivision or classification.

3. The method of claim 1 further including the steps of removing the leaching liquor from said vessel after recovery of the values, washing the solids to recover the residual leaching liquor, subsequently removing the washed solids by introducing a liquid as a high velocity jet stream in the lowermost region in the vessel to thereby pulp the solids into a pumpable slurry, and continuously removing said slurry as formed from the vessel.

4. The method of claim 1 further including the steps of removing the leaching liquid from the vessel when the mineral values have been recovered to leave at least partially depleted solids in the vessel, and subsequently removing the solids by directing a liquid jet stream into the lowermost region of the vessel and progressively moving said jet stream, the impact of the stream causing formation of a flowable slurry of said solids, and simultaneously removing freshly formed slurry continuously through the bottom of said vessel.

5. The method of claim 1 further including the additional steps of periodically withdrawing a quantity of solids from the bottom of said reactor with a minimum of liquid and periodically introducing a quantity of gas into the bottom region of said reactor, said gas rising upwardly through said vessel to thereby agitate the bed of material contained therein.

6. The method of claim 1 in which the height of said continuous solids bed is maintained at a predetermined level so that the bed fills the major portion of the reaction vessel.

7. The method of claim 6 together with the step of automatically controlling the height at said predetermined level by providing an overlying ore supply with gravity feed and choking said supply at said level.

8. The method of claim 1 in which the rotating agitating stream sweeps progressively radially outwardly from a vertical axis.

9. The method of claim 6 in which the rate of solids withdrawal is controlled by use of a discharge volume determining pipe having an inlet valve and outlet valve, comprising the additional steps of opening said inlet valve with said outlet valve in a closed position to load said pipe section, subsequently closing said inlet valve and opening said outlet valve to discharge a predetermined quantity of solids, and repeating said additional steps in sequence to periodically fill and empty the pipe section.

* * * * *